Patented Sept. 4, 1928.

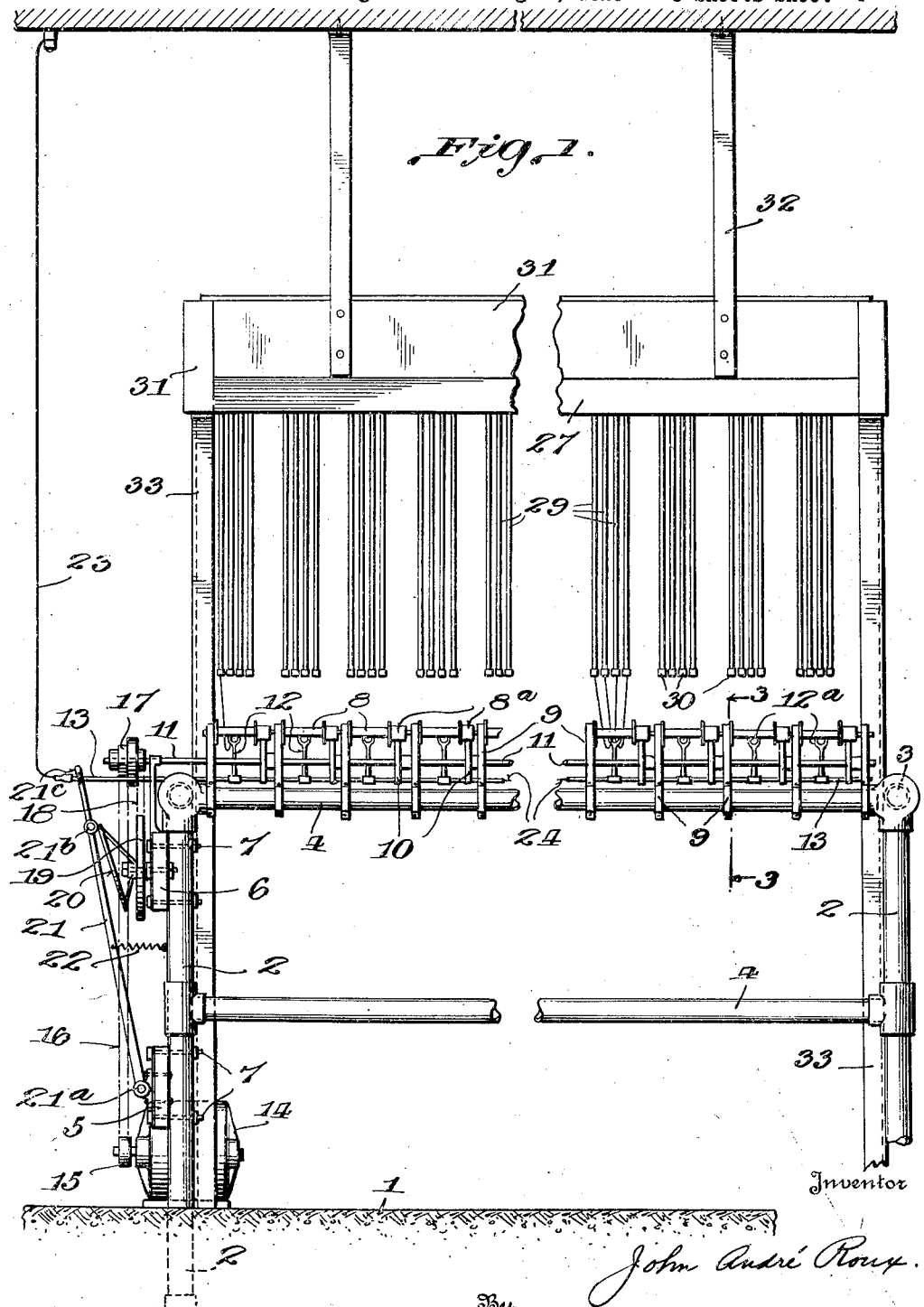

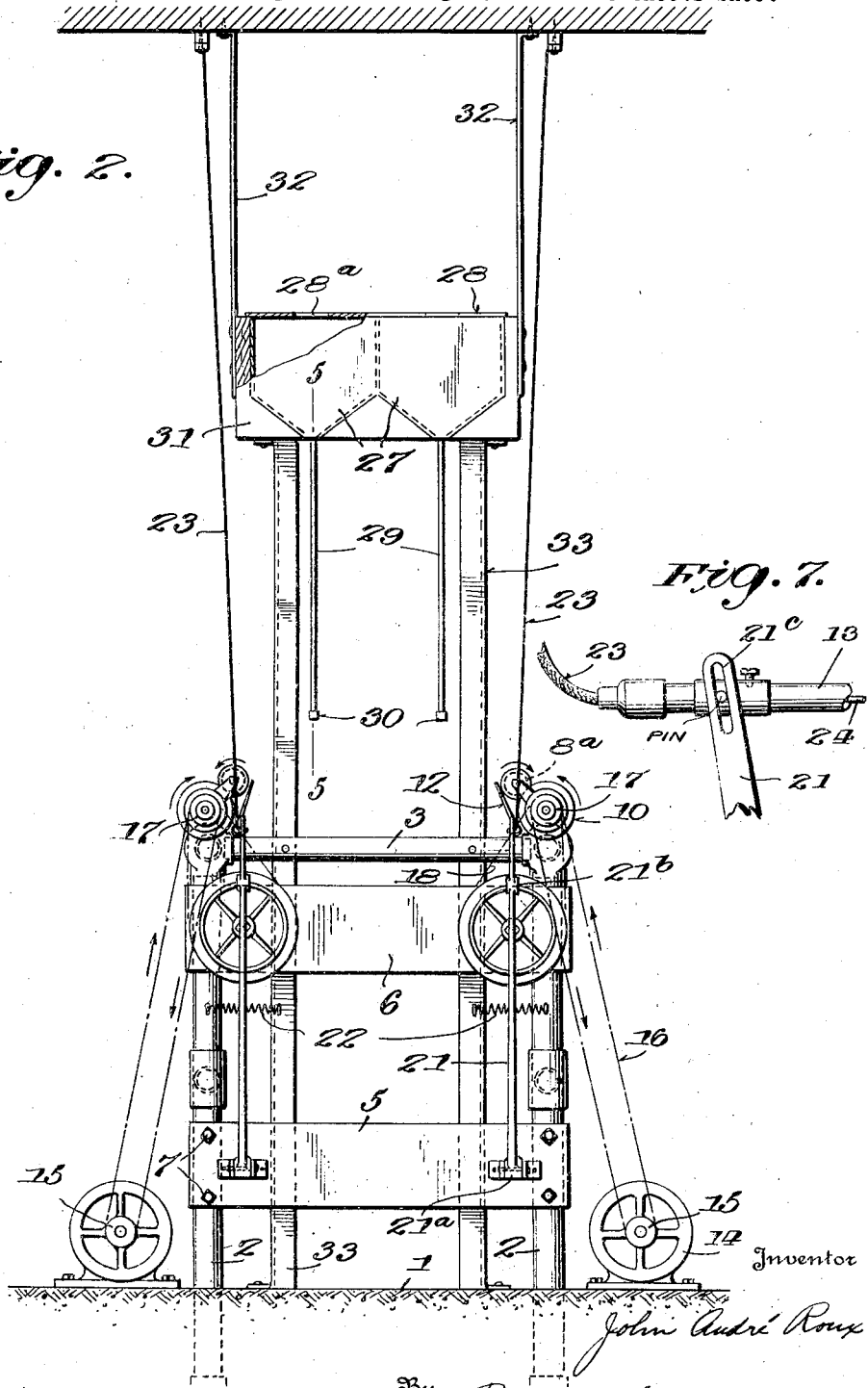

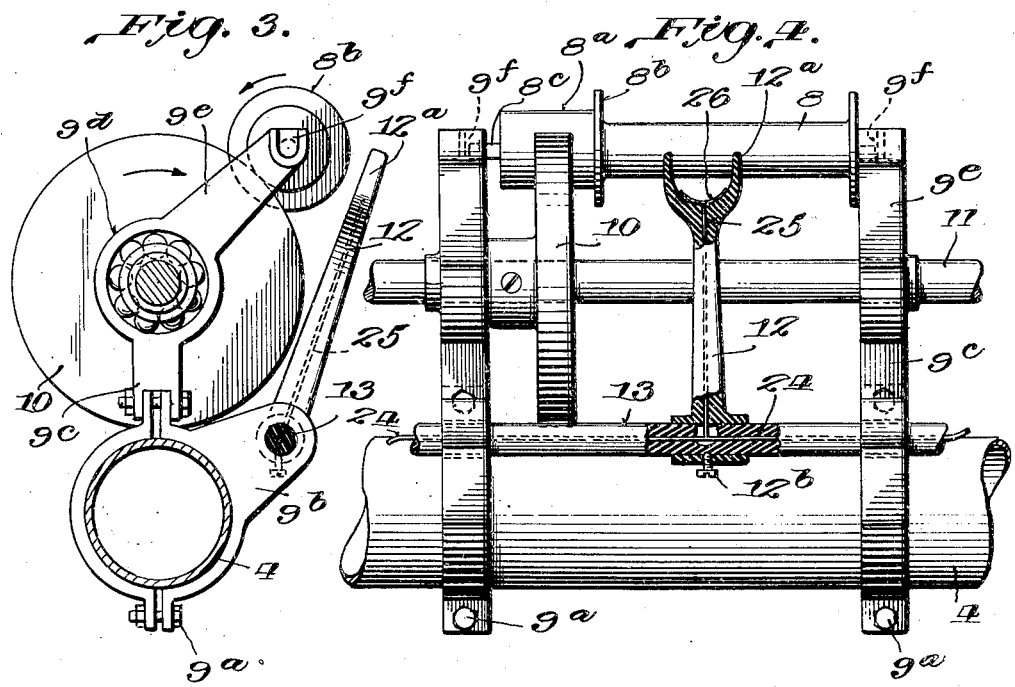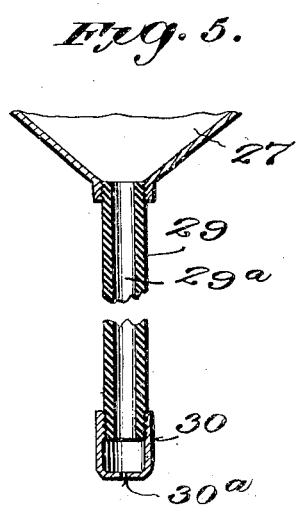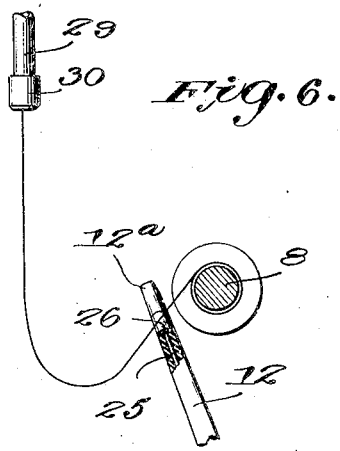

1,683,056

UNITED STATES PATENT OFFICE.

JOHN ANDRÉ ROUX, OF TENAFLY, NEW JERSEY.

PROCESS AND APPARATUS FOR PRODUCING FILAMENTS.

Application filed August 1, 1923, Serial No. 655,133. Renewed May 28, 1928.

This invention relates to the production of filaments and artificial silk, and provides a process and apparatus for leading liquid material from an orifice and drying it.

One of the objects of the invention is to provide a process and apparatus by which filaments may be formed at a relatively high rate of speed; the uniformity of size of the product maintained; and the quality and strength of the product made remarkably perfect.

Features of the invention relate to the special apparatus used and the relative arrangement of the parts of this apparatus, whereby material treated is introduced into a particular apparatus from which it is discharged as a semi-liquid and subjected thereafter to a particular electric treatment during its transformation into the completed product. The process involves the drying or solidification of the filament, as contrasted to the present used coagulating treatments effected by solutions, and further includes the feature that the material is discharged from a relatively large opening and collected as a comparatively fine silk filament, comparing favorably with natural silk.

The present invention is, similar to that described in my copending application, Serial No. 505,953, filed October 6, 1921, in that both provide an electrical dry process in which the material as it is led from the discharge orifice is reduced in size by its own weight, by the drawing action of the reel and by the electrical treatment, and is substantially solidified or dried in its travel from the discharge orifice to the collecting reel.

The particular electrical treatment includes the maintenance of static electrical field through which the filament passes in its travel to the collecting reel.

One of the features of this present invention includes the particular method in which the solution is led downward and thence upward, and thence over a charged polarizer guide arm to the winding reel. A source of static electricity has one pole thereof connected to the polarizer guide arm about which latter the static field is effective.

Another feature of the invention relates to the process and apparatus by which a plurality of filaments may be led from orifices past a single guide member and collected on a single reel, the treatment being such that each filament remains distinct from the others and is given the same electrical treatment and reduction in size which is given to single strands when treated alone.

The apparatus is an improvement generally over the equipment disclosed in my application Serial No. 505,953, in that it is now possible to produce a highly satisfactory, lustrous, strong filament comparing favorably with the filament produced in accordance with my former application and within a much shorter length of treatment as regards the filament and as regards time consumed. Likewise the new machine is much more compact. One of the features of the apparatus is the particular discharge tube of insulating material through the bore of which the solution is led before being discharged from the orifice.

Another feature includes the use of a particular combined electrified polarizer guide member and its mounting on the same frame which carries the winding reel. Other details include a modification of a bank of winding reels or bobbins and the machinery for using them, all adapted to the present artificial silk process.

The above and other details and advantages are described and claimed in the following specification and claims, and illustrated in the accompanying drawings, in which:—

Fig. 1 is a side elevation showing the discharge tubes positioned above a frame which carries a series of winding reels or bobbins;

Fig. 2 is an end view of the apparatus illustrated in Fig. 1, looking toward the right;

Fig. 3 is an enlarged view taken on the line 3—3 of Fig. 1, and illustrating the relative positions of the guide arm, the winding reel and the driving wheel for the winding reel;

Fig. 4 is a side view of the structure illustrated in Fig. 3;

Fig. 5 is a view, taken on the line 5—5 of Figure 2, representing one of the spinneret tubes of insulating material broken away in its middle portion, and illustrating the discharge orifice in the cap at the lower end;

Fig. 6 is a view illustrating the path taken by a filament in its travel from the discharge orifice over the top of the guide arm to the winding reel; and Fig. 7 is a fragmentary view illustrating the sliding connection between the actuating rocker arm and the endwise movable insulating shaft, a pin fixed to the shaft being adapted to slide in a vertical slot in the rocker arm.

Referring in detail to the drawings, like parts are identified by like reference characters in the different views. 1 indicates the foundation or floor on which is constructed a rectangular frame work comprising four uprights 2 having connecting cross braces 3 and lengthwise horizontal connecting bars 4. This frame may conveniently be formed of pipe sections joined with suitable right angle or T-pieces, as illustrated. At one end of the frame are cross supports 5 and 6, positioned respectively at the lower and upper sides of the frame and fastened to the frame by suitable bolts 7. These supports 5 and 6 serve as a mounting for portions of the apparatus, as will be described.

Referring particularly to Figs. 1, 3 and 4, winding bobbins or reels are illustrated at 8 in horizontal positions and supported on upright braces 9 which are clamped about the horizontal supports 4. These braces 9 serve also as the mounting for the friction drive wheels 10 which are fixed on a horizontal drive shaft 11, which is journaled in the supports 9. By referring to Fig. 3, it will be observed that this shaft 11 is provided with ball bearings for its mounting in the uprights 9. By referring to Figs. 3 and 4, it will be observed that the support 9 is clamped about the braces 4 and secured by means of fastening or clamping bolts 9$^a$. The brace 9 may be considered as formed of three connecting arms. One of these arms 9$^b$ extends laterally and upwardly to provide a support for an additional shaft, as will be described. The arm 9$^c$ extends from the lower portion immediately above the brace 4, upwardly, and has an enlarged portion 9$^d$ for the reception of the shaft 11 with its cooperating ball bearings. Extending upwardly from the shaft from the portion 9$^c$ and in the same general direction as that of the arm 9$^b$ is a third arm 9$^e$ which has in its upper end portion a recess 9$^f$ for the reception of the axial pins projecting from the winding reel or bobbin. The bobbin 8 has at one end thereof, a slightly enlarged cylindrical surface 8$^a$, which constitutes a driving surface by which the member is turned when in frictional engagement with the wheel 10. Between the driving surface 8$^a$ and the main collecting portion of the bobbin 8 is a flange 8$^b$. The bobbin is provided with axially extending pins 8$^c$ at its opposite ends, which pins are adapted to be slipped into the recesses 9$^f$ when the bobbin is in the operative position. The arm 9$^b$ supports the endwise movable shaft 13.

The guide arm 12 is mounted on a shaft 13, and projects upwardly, terminating in a U-shaped end with spaced arms 12$^a$ closely adjacent to the collecting portion of the winding reel or bobbin 8. This member 12 constitutes the guide member for evenly guiding the filament or thread to the surface of the reel, as the filament is collected on the reel, and the guide member is adapted to travel periodically endwise in accordance with the endwise movement of the shaft 13, to which it is fixed, by a suitable clamping screw 12$^b$. The electrical connections and the particular composition of this guide arm and its supporting shaft constitute an important part of this invention, and will be further described.

Power means and actuating equipment for moving the winding reel and guide arm is provided by a suitable motor 14, having a drive pulley 15. Power from the pulley is transmitted through a belt 16 to an upper pulley 17, mounted on and fixed to the shaft 11. Operation of the motor serves to turn the pulley 17, shaft 11, and through the friction drive wheel 10 to turn the collecting reels or bobbins 8. The pulley 17 through a belt 18, is adapted to drive a wheel 19 to effect the periodic endwise movement of the shaft 13 by means of a cam member 20, fixed to move with the driven pulley 19. The cam operates to periodically swing outwardly an upright rocker arm 21, which is pivotally mounted at its lower end 21$^a$ to the support 5. The cam engages the member 21 at the point 21$^b$ which may be provided with a suitable anti-friction device. The upper end of the rocker arm 21 is provided with a sliding connection 21$^c$ with the shaft 13, so as to permit the arm 21 to move freely with respect to the shaft but to provide endwise movement of the shaft 13. In Fig. 7, is illustrated one arrangement by which a pin carried by the shaft 13 is mounted for movement in a slot formed on the arm 21, at right angles to the shaft. A pair of springs 22 mounted on the uprights 2 and connected to the rocker arm 21 serve to constantly hold the rocker arm in engagement with the cam 20.

The electrical equipment of the illustrated apparatus will now be described. A source of static electricity, not illustrated, has the positive pole thereof connected by means of the cable 23, to the horizontally extending wire 24 which is positioned in the center of the insulating shaft 13. By referring to Fig. 4, it will be observed that the wire 24 has a connection indicated at 25 leading upwardly through the insulating material of the guide arm 12, and terminating in a curved plate 26, fitted into the lower side of the guide arm between the spaced arms 12$^a$.

This plate 26 projects only slightly above the surface of the guide arm and should be suitably smoothed at its edges to prevent damage to the filaments which pass over the top of it. The shaft 13 and the guide member 12 are formed of electrically non-conductive material, as illustrated in Fig. 4. This is necessary in order to provide that the polarizer plate 26 be insulated from the apparatus on which it is mounted and insulated from that portion of the apparatus which expresses or discharges the filament solution.

The solution reservoir and discharge equipment will now be described. The solution is placed in the hoppers or reservoirs 27, positioned above the apparatus which has been described. The hopper should have inclined bottom surfaces with an outlet at the lowermost point. A top cover is indicated at 28 and should have an opening $28^a$ therein to provide for access to the solution without rendering it necessary to remove the cover from the entire reservoir. By referring to Figs. 2 and 5, it will be seen that a vertically extending discharge tube 29 is supported at its upper end to the bottom of the hopper 27, and extends downwardly as a substantially straight tube of cylindrical shape having side walls of electrically non-conducting material and a center bore $29^a$ extending the full length of the tube. At the lower end of the tube, an aluminum cap 30 is screw-threaded over the end and has a small opening $30^a$ in its under face. The opening $30^a$ may be formed by the use of a No. 64 straight shank drill, which will provide a $\frac{1}{32}$nd inch opening. The hopper 27 is preferably supported in a frame 31 by upper supports 32 connecting with the ceiling and by lower supports 33 extending to the floor.

The operation of forming an artificial silk filament will now be described. The solution to be treated is placed in the hopper 27, and flows down through the bore $29^a$ and out through the opening $30^a$. It leaves the opening $30^a$ in a semi-liquid state, approximately of the consistency of thin molasses. The filament tends to solidify and dry fairly quickly. It is caught at a point several feet from the discharge orifice, laid over the top of the collecting spool or bobbin 8, and in a position between the arms $12^a$ of the guide member. The motor 14 is started and the winding of the filament effected on the reel. At the same time, a charge of static electricity is led to the polarizer plate 26, thus creating an electrical field about this plate and the guide arm. The apparatus is now capable of functioning to treat the filament in its passage from a discharge orifice to the polarizer and winding reel. The filament leaves the opening $30^a$, which has been stated as approximately $\frac{1}{32}$nd of an inch, flows quickly downward, solidifying and drying in its progress. It passes downwardly substantially directly beneath the discharge orifice, then it is led upwardly and over the polarizer plate to the top of the collecting spool 8. By the time it has reached the guide member and plate 26, the filament has been substantially dried and has no tendency to adhere to any surface with which it may have contact. In its passage from the discharge orifice to the guide member, the size of the filament has decreased from the size of the opening $30^a$ down to a filament so fine that it compares favorably with natural silk. Several factors assist in effecting this remarkable change in the condition of the filament. The electrical effect of the static provided by the charged plate 26 serves to increase the speed at which the material flows from the discharge orifice, apparently magnetizing and drawing out the filament with the result that it flows faster when the plate 26 is charged than when the electrical effect is not applied. The filament, instead of tending to drag on the plate 26, apparently is floated over and repelled from the plate 26, and as the guide member 12 moves the filament periodically along the length of the winding spool 8, the filament has no tendency to adhere either to the plate 26 or to the spaced arms $12^a$. The effect of the electrical charge on the filament is particularly apparent when the charge is cut off, because the filament does not maintain the evenness of its denier, it does not possess the same silky lustre which the electrically treated filament possesses, and the filament tends to drag on the surface of the guide member. At the same time, when the electrical charge is not applied, the material fails to flow as rapidly from the discharge orifice and the procedure generally is unsatisfactory.

At the time when the filament reaches the immediate region of the polarizer guide arm, it is exceedingly fine, so closely resembling a spider web strand or cocoon silk strand that the eye may sometimes fail to see it until the light strikes it properly. The filament would tend to break if it were dragged over the guide arm at a time when the static electricity was not applied. Also if the thread were tacky or sticky it would tend to adhere to the guide arm if the static was not applied. However, when the process is being conducted with the static force applied to the polarizer plate 26 the filament moves freely over the guide arm and is moved along to fill the winding bobbin or spool 8. Just what phenomena is brought about by the use of static as herein described is as yet conjectural. The fact is that the filament is not drawn to the polarizer so that it collects on the polarizer, but on the other hand it fairly floats over the polarizer plate and between the arms of the guide member when it is being wound on the spool 8. Miles of filament have been so produced without a break in the filament. Some factor prevents the filament from being caught and held on the polarizer, but just what that factor may be cannot be readily explained.

One explanation is based on the fact that ozone is freely generated at the polarizer and in its static field. The presence of ozone is most perceptible during the operation of the machine. It is suggested that as the ozone is produced it serves as a cushion between the filament and the polarizer and counteracts the attraction between the polarizer and the filament. Another theory is that the ozone nullifies the electrical attraction at the polarizer, that is immediately adjacent the polarizer plate. At any rate, the amount of static must be just sufficient to repel the fiber of the filament from the polarizer.

The static machine should be regulated, according to weather conditions, to maintain the static force constant. Under humid conditions, the electrical force should be increased, that is the "gap" at the machine widened, and under bright clear weather, the force should be reduced, that is, the "gap" closed. This electrical field throws off ozone according to recognized principles governing the conduct of static electricity. The ozone is liberated between the discharge orifice and the polarizer following the disruption of the static in the field between the polarizer and the discharge tube. The amount of the static force is regulated at the static machine. The one static machine will serve for any number of discharge tubes or tanks.

In the foregoing description, the apparatus has been described in detail for one discharge tube 29, one reel or spool and one guide member. The apparatus illustrated in Figs. 1 and 2 represents a bank or series of winding spools 8, positioned in a row and all operated simultaneously by the same motor. These parts are represented as duplicated on opposite sides of the frame 2—3—4. In addition to the duplication of collecting spools, the present invention provides for the use of a plurality of tubes 29, positioned in front of each collecting spool. In Fig. 1, four such tubes are illustrated, arranged in a row horizontally with their discharge orifices on substantially the same level and in a line parallel to the axis of the collecting spools. As a result of the electrical treatment, it is possible to lead a filament from the orifice of each of four such tubes downward and thence over the same guide member, and to wind the four filaments on a single collecting spool. In this treatment, each filament remains distinct from the others, the effect being that of winding four separate filaments at the same time. This winding of a plurality of filaments would not be effected without the application of the electrical treatment.

I claim:

1. The process of producing filaments which comprises expressing material in filament form from a discharge orifice, leading said filament from said discharge orifice past a charged polarizer member spaced from said orifice and through the electrostatic field set up thereby, and effecting substantial reduction in the size of the filament and a substantial drying of the same in the period of travel between the discharge orifice and the polarizer member, said polarizer member being located along the path of travel of said filament and between said orifice and the point of collection of said dried filament.

2. The process of producing filaments which comprises expressing material in filament form from a discharge orifice, leading said filament from said discharge orifice past a charged polarizer member spaced from said orifice and through the electrostatic field set up thereby, and effecting substantial reduction in the size of the filament in the period of travel between the discharge orifice and the polarizer member, said polarizer member being located along the path of travel of said filament and between said orifice and the point of collection of said dried filament.

3. The process of producing filaments which comprises expressing material in filament form from a discharge orifice, leading said filament from said discharge orifice, passing it through the electrostatic field of a charged polarizer member and winding it on a reel spaced from said orifice at a rate of speed faster than the rate at which it leaves the discharge orifice, said polarizer member being located along the path of travel of said filament and between said orifice and the point of collection of said dried filament.

4. The process of producing filaments which comprises expressing material in filament form from a discharge orifice, leading said filament from said discharge orifice downwardly, thence upwardly, and thence over a charged polarizer member and through the electrostatic field set up thereby, and collecting said filament on a winding reel after it has passed over said polarizer member, said polarizer member being located along the path of travel of said filament and between said orifice and the point of collection of said dried filament.

5. The process of producing filaments which comprises expressing material in filament form from a discharge orifice, leading said filament from said discharge orifice downwardly, and thence over a charged polarized member and through the electrostatic field set up thereby, collecting said filament on a winding reel after it has passed over said polarizer member, said polarizer member being located along the path of travel of said filament and between said orifice and the point of collection of said dried filament.

6. The process of producing filaments which comprises expresssing material in filament form from a discharge orifice, leading said filament from said discharge orifice downwardly, thence past a charged polarizer member and through the electrostatic field set up thereby, and collecting said filament on a winding reel after it has passed said polarizer member, said polarizer member being located along the path of travel of said filament and between said orifice and the point of collection of said dried filament.

7. The process of producing filaments which comprises expressing material in filament form from a discharge orifice, leading said filament from said discharge orifice downwardly, thence upwardly, and thence over a charged polarizer member and through the electrostatic field set up thereby, collecting said filament on a winding reel after it has passed over said polarizer member, and effecting a substantial solidification of the filament in the period of travel from said discharge orifice to the region of said polarizer member, said polarizer member being located along the path of travel of said filament and between said orifice and the point of collection of said dried filament.

8. The process of producing filaments which comprises expressing material in filament form from a discharge orifice, leading said filament from said discharge orifice downwardly, and thence over a charged polarizer member and through the electrostatic field set up thereby, collecting said filament on a winding reel after it has passed over said polarizer member, and effecting a substantial solidification of the filament in the period of travel from said discharge orifice to the region of said polarizer member, said polarizer member being located along the path of travel of said filament and between said orifice and the point of collection of said dried filament.

9. The process of producing filaments which comprises expressing material in filament form from a discharge orifice, leading said filament from said discharge orifice downwardly, thence past a charged polarizer member and through the electrostatic field set up thereby, collecting said filament on a winding reel after it has passed said polarizer member, and effecting a substantial solidification of the filament in the period of travel from said discharge orifice to the region of said polarizer member, said polarizer member being located along the path of travel of said filament and between said orifice and the point of collection of said dried filament.

10. The process of producing filaments which comprises expressing material in filament form from a discharge orifice, leading said filament from said discharge orifice downwardly, thence past a charged polarizer member and through the electrostatic field set up thereby, and effecting a substantial solidification of the filament in the period of travel from said discharge orifice to the region of said polarizer member, said polarizer member being located along the path of travel of said filament and between said orifice and the point of collection of said dried filament.

11. The process of producing filaments which comprises expressing material in filament form from a discharge orifice, leading said filament from said discharge orifice downwardly, thence upwardly, thence past a charged polarizer member and through the electrostatic field set up thereby, and effecting a substantial solidification of the filament in the period of travel from said discharge orifice to the region of said polarizer member, said polarizer member being located along the path of travel of said filament and between said orifice and the point of collection of said dried filament.

12. The process of producing filaments which comprises expressing material in filament form from a discharge orifice, leading said filament from said discharge orifice between the arms of a U-shaped charged polarizer member spaced from said orifice and through the electrostatic field set up thereby, and effecting substantial reduction in the size of the filament and a substantial drying of the same in the period of travel between the discharge orifice and the polarizer member, said polarizer member being located along the path of travel of said filament and between said orifice and the point of collection of said dried filament.

13. The process of producing filaments which comprises expressing material in filament form from a discharge orifice, leading said filament from said discharge orifice between the arms of a U-shaped charged polarizer member spaced from said orifice and through the electrostatic field set up thereby, and effecting substantial reduction in the size of the filament in the period of travel between the discharge orifice and the polarizer member, said polarizer member being located along the path of travel of said filament and between said orifice and the point of collection of said dried filament.

14. The process of producing filaments which comprises expressing material in filament form from a discharge orifice, leading said filament from said discharge orifice, leading said filament downwardly, thence upwardly, and thence between the arms of a U-shaped charged polarizer member and through the electrostatic field set up thereby, and collecting said filament on a winding reel after it has passed said polarizer member, said polarizer member being located along the path of travel of said filament and between said orifice and the point of collection of said dried filament.

15. The process of producing filaments which comprises expressing material in filament form from a discharge orifice, leading said filament from said discharge orifice downwardly, and thence over and between the arms of a U-shaped charged polarized member and through the electrostatic field set up thereby, and collecting said filament on a winding reel after it has passed over said polarizer member, said polarizer member being located along the path of travel of said filament and between said orifice and the point of collection of said dried filament.

16. The process of producing filaments which comprises expressing material in filament form from a discharge orifice, leading said filament from said discharge orifice downwardly, thence past and between the arms of a U-shaped charged polarizer member and through the electrostatic field set up thereby, and connecting said filament on a winding reel after it has passed said polarizer member, said polarizer member being located along the path of travel of said filament and between said orifice and the point of collection of said dried filament.

17. The process of producing filaments which comprises expressing material in filament form from a discharge orifice, leading said filament from said discharge orifice downwardly, thence upwardly and thence over and between the arms of a forked polarizer member and through the electrostatic field set up thereby, collecting said filament on a winding reel after it has passed over said polarizer member, and effecting a substantial solidificataon of the filament in the period of travel from said discharge orifice to the region of said polarizer member, said polarizer member being located along the path of travel of said filament and between said orifice and the point of collection of said dried filament.

18. The process of producing filaments which comprises expressing material in filament form from a discharge orifice, leading said filament from said discharge orifice downwardly, and thence over and between the arms of a forked charged polarizer member and through the electrostatic field set up thereby, collecting said filament on a winding reel after it has passed over said polarizer member, and effecting a substantial solidification of the filament in the period of travel from said discharge orifice to the region of said polarizer member, said polarizer member being located along the path of travel of said filament and between said orifice and the point of collection of said dried filament.

19. The process of producing filaments which comprises expressing material in filament form from a discharge orifice, leading said filament from said discharge orifice downwardly, thence past a polarizer member having a charged plate and upwardly extending spaced arms and through the electrostatic field set up thereby, collecting said filament on a winding reel after it has passed said polarizer member, and effecting a substantial solidification of the filament in the period of travel from said discharge orifice to the region of said polarizer member, said polarizer member being located along the path of travel of said filament and between said orifice and the point of collection of said dried filament.

20. The process of producing filaments which comprises expressing material in filament form from a discharge orifice, leading said filament from said discharge orifice downwardly, thence between the arms of a polarizer member having a charged plate and upwardly extending spaced arms and through the electrostatic field set up thereby, and effecting a substantial solidification of the filament in the period of travel from said discharge orifice to the region of said polarizer member, said polarizer member being located along the path of travel of said filament and between said orifice and the point of collection of said dried filament.

21. The process of producing filaments which comprises expressing material in filament form from a discharge orifice, leading said filament from said discharge orifice downwardly, thence upwardly, thence between the arms of a polarizer member having a charged plate and upwardly extending arms and through the electrostatic field set up thereby, and effecting a substantial solidification of the filament in the period of travel from said discharge orifice to the region of said polarizer member, said polarizer member being located along the path of travel of said filament and between said orifice and the point of collection of said dried filament.

22. Apparatus for producing filaments comprising a spinneret member having a discharge orifice, a filament receiving member, a charged polarizer guide member, and means for varying the position of said guide member with respect to said receiving member.

23. Apparatus for producing filaments comprising a spinneret member having a discharge orifice, a filament receiving member, an electrically charged polarizer guide member, and means for moving said guide member periodically with respect to said receiving member.

24. Apparatus for producing filaments comprising a spinneret member having a discharge orifice, a winding reel mounted on its horizontal axis, a charged polarizer guide member, and means for moving said guide member in a direction parallel to the axis of said reel.

25. In a machine for producing and winding elements, means for subjecting the filament to an electrical treatment, and a guide member for leading the filament to a winding reel, said guide member including a plurality of spaced guide arms, said guide member and arms being formed of electrically non-conductive material.

26. In a machine for producing and winding filaments, a U-shaped guide member having a charged polarizer plate in the curve thereof.

27. In a machine for producing and winding filaments, a guide member comprising a stem portion and a plurality of spaced guide arms projecting from said stem portion, said stem and said arms being formed of electrically non-conductive material, and an electrically conductive element extending through said stem and terminating in a conductor positioned on the surface between said spaced arms.

28. Apparatus for producing filaments comprising a spinneret member having a discharge orifice, a metal frame, a winding reel mounted on said frame, and a charged polarizer guide member mounted on said frame and insulated therefrom.

29. Apparatus for producing filaments comprising a spinneret member having a discharge orifice, a metal frame, a winding reel mounted on said frame, a charged polarizer guide member mounted on said frame and insulated therefrom, and means to move said guide member axially of said reel.

30. Apparatus for producing filaments comprising a spinneret member having a discharge orifice, a winding reel, and a charged polarizer guide member insulated from said winding reel.

31. Apparatus for producing filaments comprising a spinneret member having a discharge orifice, means for subjecting the filament to an electrical treatment, a winding reel, a guide arm shaft extending axially lengthwise of said reel and formed of electrically non-conductive material, and a guide arm projecting from said shaft.

32. Apparataus for producing filaments comprising a spinneret member having a discharge orifice, means for subjecting the filament to an electrical treatment, a winding reel, a guide arm shaft extending axially lengthwise of said reel and formed of electrically non-conductive material, a guide arm projecting from said shaft, and means to move said shaft and the guide arm thereon lengthwise of said reel.

33. Apparatus for producing filaments comprising a spinneret member having a discharge orifice, a winding reel, a guide arm shaft extending lengthwise of said reel and formed of electrically non-conductive material, a guide arm projecting from said shaft, and an electric conductor extending lengthwise within said shaft.

34. Apparatus for producing filaments comprising a spinneret member having a discharge orifice, a winding reel, a guide arm shaft extending lengthwise of said reel and formed of electrically non-conductive material, a guide arm projecting from said shaft, an electric conductor extending lengthwise within said shaft, and means to move said shaft lengthwise of said reel.

35. Apparatus for producing filaments comprising a winding reel, a plurality of discharge orifices arranged in a row, and a charged guide member located between said reel and said orifices and adapted to lead a plurality of filaments, one from each orifice, to winding position on said reel.

36. Apparatus for producing filaments comprising a winding reel, a plurality of discharge orifices arranged in a row horizontally, and a charged guide member located between said reel and said orifices and adapted to lead a plurality of filaments, one from each orifice, to winding position on said reel.

37. Apparatus for producing filaments comprising a winding reel, a plurality of spaced discharge tubes extending downwardly and each having a discharge orifice at its lower end, and a charged guide member located between said reel and said orifices and adapted to lead a plurality of filaments, one from each orifice, to winding position on said reel.

38. Apparatus for producing filaments comprising a winding reel, a plurality of spaced discharge tubes arranged in a row horizontally, each having a discharge orifice at its lower end and having a body portion of electrically non-conductive material, and a charged guide member located between said reel and said orifices and adapted to lead a plurality of filaments, one from each orifice, to winding position on said reel.

39. The process of forming filaments, which process comprises leading a plurality of filaments, one from each of a plurality of discharge orifices, leading said filaments past an electrically charged polarizer member and through the electrostatic field set up thereby, winding said filaments on a reel, and effecting a reduction in the size of said filaments and a substantial drying of the same in their travel from the discharge orifices to said polarizer member, said polarizer member being located along the path of travel of said filament and between said orifice and the point of collection of said dried filament.

40. The process of forming filaments, which process comprises leading a plurality of filaments, one from each of a plurality of discharge orifices, leading said filaments over and past an electrically charged polarizer member and through the electrostatic field set up thereby, winding said filaments on a reel, and effecting a reduction in the size of said filaments and a substantial drying of the same in their travel from the discharge orifices to said polarizer member, said polarizer member being located along the path of travel of said filament and between said orifice and the point of collection of said dried filament.

41. The process of forming filaments, which process comprises leading a plurality of filaments, one from each of a plurality of discharge orifices, leading said filaments over the top of and between the arms of a U-shaped electrically charged guide member and through the electrostatic field set up thereby, and winding said filaments on a single reel, the passage of any given part of a filament from the discharge orifice to the reel being characterized by a substantial reduction in the size of each filament and a drying of the same, said polarizer member being located along the path of travel of said filament and between said orifice and the point of collection of said dried filament.

In testimony whereof I affix my signature.

JOHN ANDRÉ ROUX.